Sept. 24, 1974
D. CUAZ ET AL
3,838,061
METHOD OF PACKAGING OF RADIOACTIVE WASTES
Filed March 14, 1972
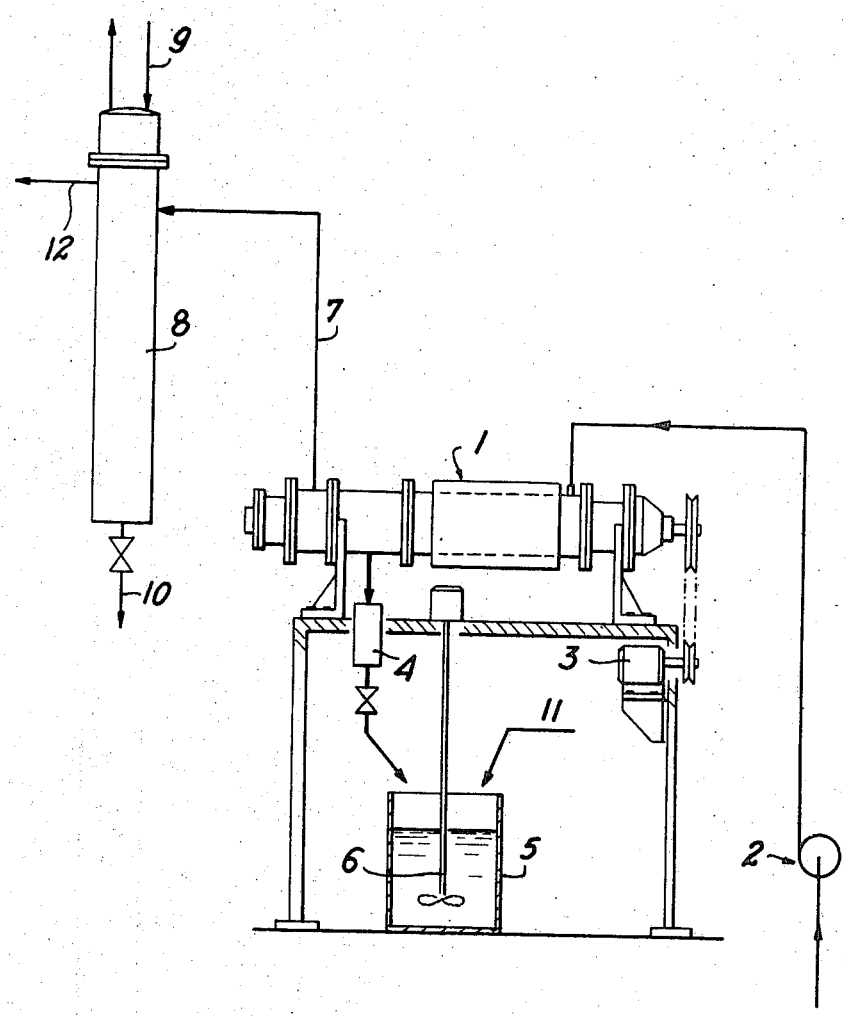

United States Patent Office 3,838,061
Patented Sept. 24, 1974

3,838,061
METHOD OF PACKAGING OF RADIOACTIVE WASTES
Daniel Cuaz, Les Eymes, Paul Pottier, Manosque, and Daniel Thiery, St. Martin d'Heres, France, assignors to Commissariat a Energie Atomique, Paris, France
Filed Mar. 14, 1972, Ser. No. 234,631
Claims priority, application France, Mar. 16, 1971, 7109057
Int. Cl. C09k 3/00
U.S. Cl. 252—301.1 W
3 Claims

ABSTRACT OF THE DISCLOSURE

Radioactive wastes which have previously been converted to the state of dry powder are incorporated in a resin which is polymerizable at room temperature. The resin is then copolymerized with a monomer in order to obtain a solid which exhibits high leach resistance and long-term retention of radioactivity.

---

This invention is concerned with a method of packaging of radioactive wastes presented in various forms such as concentrates of liquid effluents, powdered products, ashes produced by incineration of fuel wastes and the like. For reasons of simplification of the description which now follows, consideration will be given more particularly to the packaging of liquid-effluent concentrates since this case is in fact of considerable practical importance, although it must be understood that the method according to the invention also applies to the other waste products mentioned above.

It is also a known practice to subject liquid effluents to an initial treatment which consists in removing the greater part of the water by concentration, then in converting the concentrates to a solid product in the form of blocks which may or may not be enclosed in containers. A method at present in use consists in solidifying the concentrates by means of a mixture of cement and vermiculite in prefabricated concrete blocks.

The present invention is directed to a method which makes it possible, in contrast to the above-mentioned method of the prior art, to reduce the volume and the weight of the final packaging as well as the cost price, while also permitting good retention in time of the radioactivity in the blocks which are obtained.

The method in accordance with the invention is characterized in that the radioactive waste products which have previously been converted to the state of dry powder are incorporated in a resin which is polymerizable at room temperature and that said resin is then copolymerized with a monomer so as to obtain a solid block.

A better understanding of the invention will be gained from the following description of one embodiment of the method which is given by way of non-limitative example.

In the example selected, there is employed a resin of unsaturated polyester such as, for example, a resin having a base of propylene glycol maleophthalate. This resin (IV) is obtained by condensation of two dibasic acids in their anhydrous form, namely maleic anhydride (I) and phthalic anhydride (II) with propylene glycol (III) in accordance with the following reaction diagram (1):

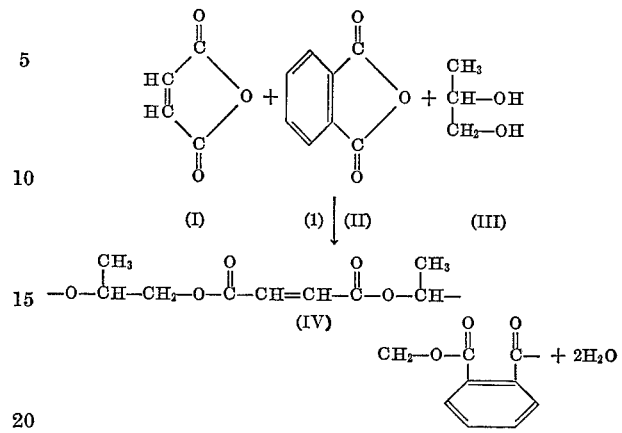

This thermoplastic resin (IV) is mixed in its two-dimensional long-chain form with a monomer (V) such as styrene having the formula:

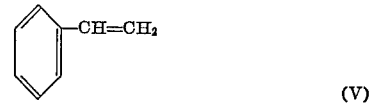

The resin (IV) and the styrene (V) combine in a copolymerization reaction, and the styrene (V) forms a crosslink between the unsaturated units of resin (IV) so as to produce a three-dimensional, thermosetting and cured resin (VI). The resin VI can be represented as follows:

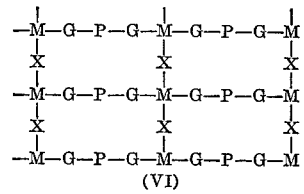

wherein

M represents the maleic residue of reaction (1)
P represents the phthalic residue of reaction (1)
G represents the glycol residue of reaction (1)
X represents styrene.

The advantage of this copolymerization reaction lies in the fact that it is carried out in the cold state. It is in fact only necessary to activate the cross-linkage by means of a free-radical mechanism which causes opening of the double bonds by employing an "initiator" such as, for example, methyl-ethylketone peroxide. Dissociation of this peroxide from methyl-ethylketone is produced by means of a substance such as cobalt naphthenate, for example.

The dry powder, which has a water content of less than 1%, is coated with the resin (IV) at its two-dimensional physical stage prior to copolymerization with styrene which makes it possible to obtain the resin (VI) in the form of a solid block.

In the final stage, the three-dimensional structure of the resin (VI) advantageously prevents penetration of the molecules of solvents such as water.

In the example under consideration, medium-active concentrates of liquid effluents have been processed, the composition and radioactivity of these concentrates being given in the two tables hereunder.

TABLE I.—CHEMICAL ANALYSIS OF CONCENTRATES

| | | |
|---|---|---|
| $PrO_5$ | g./l | 4.35 |
| $Cl^-$ | g./l | 74.5 |
| $SO_4^{--}$ | g./l | 6.5 |
| $NO_3^-$ | g./l | 55.8 |
| $Na^+$ | g./l | 61 |
| $K^+$ | g./l | 1.6 |
| $Ca^{++}$ | g./l | 0.5 |
| $NH_4^+$ | g./l | 0.65 |
| U | g./l | 2.6 |

TABLE II.—RADIOCHEMICAL ANALYSIS OF THE CONCENTRATE STUDIED

| Element: | Type of radiation measured | Activity in $\mu$Ci/ml. | Half-life |
|---|---|---|---|
| $^{90}Sr$ | $\beta$ | $3 \times 10^{-2}$ | 28 years. |
| $^{137}Cs$ | $\gamma$ | $6.1 \times 10^{-2}$ | 30 years. |
| $^{60}Co$ | $\gamma$ | $1.4 \times 10^{-2}$ | 5.24 years. |
| $^{144}Ce$ | $\gamma$ | $2 \times 10^{-2}$ | 285 days. |
| $^{54}Mn$ | $\gamma$ | $2.8 \times 10^{-3}$ | 280 days. |
| $^{65}Zn$ | $\gamma$ | $1.1 \times 10^{-2}$ | 245 days. |
| $^{95}Zr + {}^{95}Nb$ | $\gamma$ | $<7 \times 10^{-4}$ | 65 days. |
| U | $\alpha$ | (a) | | a See chemical analysis.

These concentrates were dried in a thin-film evaporator; 50 parts by weight of the dry powder obtained and having a water content $\leqslant 0.3\%$ were then mixed with 50 parts of resin (IV), 0.2 part of catalyst (methylethylketone peroxide) and 0.1 part of accelerator (cobalt naphthenate). The blocks obtained after polymerization were subjected to different tests.

It has been found that the compressive strength is higher than that obtained by encasing in cement. Moreover, no change in the mechanical strength appears after exposure to radiation at a level of 300,000 rads.

The effectiveness of radioactivity retention has been demonstrated by leaching tests. The blocks are immersed in permuted water and the fraction of radioactivity which has passed into the water is then measured periodically. It is found that the resin retains strontium-90 and cesium-137 much more effectively than the cement-vermiculite mixture which was utilized heretofore.

It is also possible to improve the results even further by carrying out in a manner known *per se* a preliminary treatment of insolubilization of the radioactive elements on the effluent concentrates.

This insolubilization treatment is carried out:

either by treatment of the solution with a pre-formed precipitate of $CoK_2[Fe(CN)_6]$ as obtained by mixing potassium ferrocyanide with cobalt nitrate, or by adding to the solution a mixture of potassium ferrocyanide and nickel sulphate.

By means of this treatment, much less extensive leaching of the radioactive elements is observed when the blocks obtained by means of the method according to the invention are immersed in permuted water, in particular in the case of cesium which has been insolubilized in the form of $CoCs[Fe(CN)_6]$.

A comparative study carried out on the basis of the treatment of the above concentrates of effluents by means of the method according to the invention and by means of the method of packaging with a cement-vermiculite mixture has produced the following results, in which these two methods are designated respectively as method I and method II.

$$\text{Ratio of volumes } \frac{\text{Method II}}{\text{Method I}} = 12.8$$

$$\text{Ratio of weights } \frac{\text{Method II}}{\text{Method I}} = 16.7$$

The cost price of method I is 37.5% of the cost price of method II.

It is thus observed that, for a distinctly lower cost price, there is obtained by means of the method according to the invention a substantial reduction both in volume and in weight of the blocks obtained after packaging.

The method according to the invention is carried into practical effect by means of the device which is illustrated in the accompanying schematic diagram.

Whether a preliminary insolubilization treatment has been performed or not, the solution of effluents is conveyed into the cylindrical calandria 1 of a thin-film evaporator such as, for example, an apparatus which is marketed under the trade name "Rototherm," by means of a pump 2. The calandria 1 comprises a rotor constituted by a wedge-shaped horizontal shaft (not illustrated in the figure) which is provided with longitudinal blades.

The calandria 1 is heated by saturated steam at a pressure of 3 to 10 bars.

The rotor of the calandria 1 is driven in rotation by means of a motor 3 in such a manner as to apply the product to be treated against the internal wall of the calandria 1. The blades of the rotor, the extremity of which is located at a distance of approximately 1 mm. from the calandria, perform a scraping function.

This drying operation is carried out in a vacuum of the order of 50 millibars, for example, in order to prevent any external contamination.

The dry concentrate obtained in the form of powder passes out of the calandria 1 by means of the duct 4 and is collected in the vessel 5 in which it is mixed by means of an agitator 6 with the resin supplied at 11.

The evaporation water passes out of the calandria 1 through the duct 7 and condenses in a small plate column 8 which is cooled by the water supplied at 9. This condensed water is collected at 10 and can be discharged after monitoring. A vacuum is produced within the plate column 8 by means of a pipe 12.

The method according to the invention permits a considerable reduction in the volume and weight of the final packaging of the concentrates while ensuring good retention of radioactivity.

What we claim is:

1. A method of packaging dry, powdery radioactive wastes which comprises mixing 50 parts by weight of said wastes with 50 parts by weight of a thermosetting, unsaturated polyester resin, adding a vinyl monomer to the mixture of said wastes and said resin and catalytically copolymerizing said resin and said monomer at room temperature to produce a thermosetting, cured, solid block.

2. A method according to claim 1 wherein said unsaturated polyester has a base of propylene glycol maleophthalate.

3. A method according to claim 1 wherein said monomer is styrene.

References Cited

UNITED STATES PATENTS

| 3,463,738 | 8/1969 | Fitzgerald et al. | 252—301.1 W |
| 2,769,780 | 11/1956 | Clifford | 252—301.1 W X |

FOREIGN PATENTS

| 962,582 | 7/1964 | Great Britain | 252—301.1 W |

CARL D. QUARFORTH, Primary Examiner

R. L. TATE, Assistant Examiner